United States Patent
Turner et al.

(10) Patent No.: US 9,507,482 B2
(45) Date of Patent: Nov. 29, 2016

(54) ELECTRONIC SLIDE PRESENTATION CONTROLLER

(71) Applicant: Narsys, LLC, Milwaukee, WI (US)

(72) Inventors: Devin Turner, Madison, WI (US); Charles Beckwith, Milwaukee, WI (US)

(73) Assignee: Narsys, LLC, St. Louis, MO (US)

( * ) Notice: Subject to any disclaimer, the term of this patent is extended or adjusted under 35 U.S.C. 154(b) by 0 days.

(21) Appl. No.: 14/508,737

(22) Filed: Oct. 7, 2014

(65) Prior Publication Data

US 2015/0138213 A1    May 21, 2015

Related U.S. Application Data

(60) Provisional application No. 61/887,567, filed on Oct. 7, 2013.

(51) Int. Cl.
| | |
|---|---|
| *G06F 13/14* | (2006.01) |
| *G06F 3/048* | (2013.01) |
| *G09G 5/00* | (2006.01) |
| *G06F 3/14* | (2006.01) |
| *G09G 3/00* | (2006.01) |
| *G09G 5/02* | (2006.01) |
| *G09G 5/14* | (2006.01) |

(52) U.S. Cl.
CPC ............ *G06F 3/048* (2013.01); *G06F 3/1423* (2013.01); *G09G 3/002* (2013.01); *G09G 5/00* (2013.01); *G09G 5/026* (2013.01); *G09G 5/14* (2013.01); *G09G 2340/0492* (2013.01); *G09G 2340/10* (2013.01); *G09G 2340/12* (2013.01); *G09G 2340/14* (2013.01); *G09G 2354/00* (2013.01); *G09G 2370/16* (2013.01)

(58) Field of Classification Search
None
See application file for complete search history.

(56) References Cited

U.S. PATENT DOCUMENTS

| | | | |
|---|---|---|---|
| 2003/0017846 A1 | 1/2003 | Estevez et al. | |
| 2004/0165010 A1* | 8/2004 | Robertson | G06F 3/0481 715/805 |
| 2005/0024387 A1* | 2/2005 | Ratnakar | G06T 11/60 345/629 |
| 2006/0079214 A1 | 4/2006 | Mertama et al. | |
| 2006/0136828 A1* | 6/2006 | Asano | G06F 3/1454 715/733 |
| 2009/0019399 A1* | 1/2009 | Matsunaga | G06F 3/04817 715/838 |
| 2009/0125824 A1 | 5/2009 | Andrews et al. | |
| 2009/0228842 A1* | 9/2009 | Westerman | G06F 3/04883 715/863 |
| 2009/0307768 A1* | 12/2009 | Zhang | G06F 21/36 726/19 |
| 2011/0078573 A1* | 3/2011 | Ooba | G06F 9/4443 715/733 |
| 2011/0271226 A1* | 11/2011 | Janssen | H04L 29/06 715/794 |

(Continued)

FOREIGN PATENT DOCUMENTS

| | | |
|---|---|---|
| CN | 102184023 A | 9/2011 |
| CN | 103365557 A | 10/2013 |
| EP | 2715490 A1 | 4/2014 |

*Primary Examiner* — Kee M Tung
*Assistant Examiner* — Frank Chen
(74) *Attorney, Agent, or Firm* — Boyle Fredrickson, S.C.

(57) ABSTRACT

A presentation system provides a for an audience display and a mobile wireless device operates to reserve a portion of the display screen of the mobile wireless device that is not mirrored to the audience display allowing ancillary functions of the mobile wireless device to be accessible during a presentation without visibility to the audience. Image output data from these functions may be dragged into the portion of the display that is mirrored. Those ancillary functions may include presentation specific functions such as pointers, drawing program tools, keyboards and the like, or more generally other tasks executable on the mobile wireless device.

15 Claims, 17 Drawing Sheets

(56) References Cited

U.S. PATENT DOCUMENTS

| | | | | |
|---|---|---|---|---|
| 2012/0110501 A1* | 5/2012 | Baek | ................ | G06F 3/0481 715/800 |
| 2013/0275912 A1* | 10/2013 | He | ................ | G06F 3/0484 715/804 |
| 2014/0149931 A1* | 5/2014 | Miki | ................ | G06F 9/4443 715/803 |
| 2014/0164520 A1 | 6/2014 | Fan | | |
| 2014/0171169 A1* | 6/2014 | Hampton | ................ | A63F 1/18 463/11 |

* cited by examiner

ELECTRONIC SLIDE PRESENTATION CONTROLLER

CROSS REFERENCE TO RELATED APPLICATION

The present application claims the benefit of U.S. provisional application 61/887,567 filed Oct. 7, 2013, and hereby incorporated by reference.

STATEMENT REGARDING FEDERALLY SPONSORED RESEARCH OR DEVELOPMENT

—

BACKGROUND OF THE INVENTION

The present invention relates to electronic slide presentation systems, such as those useable with PowerPoint® presentations, and in particular to such a system including a presenter interface providing improved control of electronic slide presentations.

Speakers presenting information to an audience have historically relied upon visual aids beginning with paper charts and progressing through transparencies for use with an overhead projector and most recently electronic "slides" projected using a digital projector and generated using presentation software such as PowerPoint or the like.

With electronic slides, the speaker normally uses a laptop or the like ("a speaker-device") running presentation software which allows for both the development of the presentation in a "development mode" and the display of the presentation in a "presentation mode". In the presentation mode, the display of the speaker-device duplicates the information that will be sent to the digital projector and viewed by the audience, allowing the digital projector to be connected to the speaker-device as an external display duplicating the display of the speaker-device, hi the presentation mode, the speaker can advance slides by using keystroke commands or mouse buttons, or a remote wireless device typically simulating a mouse.

When the speaker-device provides hardware to support separate monitors, the presentation software allows the speaker to view notes associated with each slide that are not visible to the audience. Without this hardware capability, however, these notes are normally not visible in the presentation mode. When the speaker-device is a conventional laptop having wired connections to an external projector or the like, the speaker is necessarily tethered to this laptop if they want the additional functionality of viewing notes. Frequently, at the end or beginning of the presentation, the presentation software will exit into the development mode or will inadvertently display the user's "desktop" which may be distracting and unprofessional. Because the speaker's view of the presentation is limited to the same single slide presented to the audience, the speaker can often lose track of his or her position within the presentation and/or fail to anticipate an upcoming slide. Frequently, at the end or beginning of the presentation, the presentation software will exit into the development mode or will inadvertently display the user's "desktop" which may be distracting and unprofessional. Because the speaker's view of the presentation is limited to the same single slide presented to the audience, the speaker can often lose track of his or her position within the presentation and/or fail to anticipate an upcoming slide.

In order to refer to specific portions of the slide, the speaker may employ a laser pointer. Such a pointing device can often be difficult for the speaker to orient when the speaker must stay in proximity to the speaker-device, the latter often located near the projection screen.

SUMMARY OF THE INVENTION

The present invention permits a standard wireless mobile device to serve as the speaker-device for the control of the presentation of electronic slides. Importantly, the invention dedicates only a portion of the display of the wireless device to the presented slide while reserving other portions of the display to be visible only to the speaker. Image data output by programs or tasks in the portion of the display not visible to the audience, may be dragged into that portion visible to the audience allowing flexible control of what is visible to the audience and what is not. In this way, the speaker gains the mobility provided by wireless device while retaining retains ancillary functionality of the wireless device that may be used to augment the presentation through notes, editing, highlighting and the like without necessarily requiring a proprietary presentation program that accomplishes all of these features. By segregating the presented slides in a portion of the wireless device display screen and limiting that portion only to be visible to the audience, the risk of unintended display of non-slide information is greatly reduced.

Specifically, in one embodiment, the invention provides a presentation system having an audience display system including a wireless receiver and adapted to generate a presentation image for viewing by an audience. The presentation system also provides a mobile wireless device operating to: (a) execute at least one task program to generate an electronic slide image and an electronic non-slide image; (b) display the electronic slide image on a first portion of the device screen; (c) display the electronic non-slide image on a second portion of the device screen different from the first portion; (d) accept input from the presenter to slide the electronic non-display image from the second portion of the device screen to the first portion of the device screen to combine electronic display image and electronic non-display image; and (e) transmit as an electronic image signal to the audience display system, the electronic display image and the electronic non-display image limited to the area of the first portion of the device screen.

It is thus a feature of at least one embodiment of the invention to provide an improved presentation controller for a speaker that preserves a portion of the display and input of the mobile device that are not mirrored to the audience display, to allow other functions of the mobile device to be accessed without view by the audience.

The presenter input may be a touch surface coextensive with the device screen and the mobile wireless device made to receive input from the presenter via the presenter input over areas of the touch surface commensurate with the first and second portion of the device screen.

It is thus a feature of at least one embodiment of the invention to allow mirroring of an image to an audience display while preserving touch screen inputs related to that mirrored image on the mobile device in this way, touch inputs on the device screen can control both the mobile wireless device and affect the image mirrored to the remote display The electronic processor may further receive presenter input to change an area of the first portion with respect to the second portion.

It is thus a feature of at least one embodiment of the invention to provide a slide presentation program that is not locked into a fixed presentation context for example as would be the case with a slide presentation program.

The electronic non-display image is a cine image.

It is thus a feature of at least one embodiment of the invention to allow the presenter to freely incorporate movies or the like into a presentation in an easy to control fashion.

The electronic display image may be generated by a first task program running independently of a second task program generating the electronic non-display image.

It is thus a feature of at least one embodiment of the invention to allow a slide presentation system that may work with unrelated programs to provide a superior presentation experience.

The presenter input over areas of the touch surface commensurate with the first portion of the display screen may be used to control a display of only a portion of the electronic slide image on the first portion of the screen to allowing a zooming or panning of the electronic slide signal.

It is thus a feature of at least one embodiment of the invention to accommodate possible mismatch in resolution between the mobile device screen and the audience display by allowing zooming and panning at the mobile device without affecting the displayed image. Alternatively the displayed image may also be affected allowing an additional dimension of control of the slides that permits zooming in and panning in a manner visible to the audience.

The electronic non-slide image may provide textual notes associated with electronic slide image signals currently displayed.

It is thus a feature of at least one embodiment of the invention to allow real-time mobile access by the speaker to slide notes without the notes being visible to the audience.

The electronic non-slide image provides a reduced size representation flanking electronic slide images in a sequence with the electronic slide image and not currently transmitted as electronic image signals to the digital presentation display.

It is thus a feature of at least one embodiment of the invention to provide a more forgiving and intuitive way of controlling slides that allows preview by the speaker User input over areas of the touch surface commensurate with the first portion of the display may be used to control a pointer image composited in an electronic slide image transmitted to the audience display system.

It is thus a feature of at least one embodiment of the invention to eliminate the need for a separate laser pointer to emphasize features on the electronic slide images displayed to the audience.

The mobile wireless device may further generate a pointer trajectory image and composite the pointer trajectory image and the pointer image into the electronic slide image transmitted to the audience display system.

It is thus a feature of at least one embodiment of the invention to permit the speaker to draw on the electronic slide images in real time in the manner of the chalkboard.

The mobile wireless device may further accept input from the presenter input over areas of the touch surface commensurate with the second portion of the display to provide for text entry and may accept input from the presenter input over areas of the touch surface commensurate with the first portion to identify a location of text images from the text entry and to composite the text images with the electronic slide image transmitted to the audience display system.

It is thus a feature of at least one embodiment of the invention to allow the speaker to "type" text directly on the slides as presented.

The mobile device executes a first task providing an image of the display screen and a second task selecting a portion of the image of the display screen as the electronic slide image.

It is thus a feature of at least one embodiment of the invention to permit selective transmission of slide images from a mobile device with third-party slide programs simply by aligning a transmission window over the necessary slide data. It is another feature of at least one embodiment of the invention to permit portions of any program to be displayed to an audience while reserving displayed functionality of the mobile device.

The mobile device may operate to generate at least one display-only image to be composited with the electronic non-slide image and transmitted as an electronic image signal to the audience display system and not displayed on the first portion of the display screen.

It is thus a feature of at least one embodiment of the invention to provide a revenue model in which the audience receives an advertising message without that message interfering with operation of the mobile wireless device.

The mobile wireless device may operate to generate in a first mode a presenter overlay image visually superimposed on the electronic slide image on a first portion of the display screen and not transmitted as an electronic image signal to the audience display system and in a second mode, to composite the presenter overlay image with the electronic slide image as transmitted to the audience display system, and wherein the electronic computer switches between the first mode and the second mode according to input received through the presenter input.

It is thus a feature of at least one embodiment of the invention to allow the presenter to preview review changes to the slide before being viewed by the audience to permit editing or other corrections or preprepared slide overlays.

General comments: I think it is important to include real time sequential sharing of mirrored slides to other users via internet or peer to peer connection (live twitter feature). This could be wrapped up with claim 2/3 or broken out into a separate application with its own detailed features etc. Language about the 'fling to mirror' feature could also be easily included as part of a sub claim. Based on the summary I am not sure if the porthole AND selective screen mirroring rectangle features are both included These particular features and advantages may apply to only some embodiments falling within the claims and thus do not define the scope of the invention.

DETAILED DESCRIPTION OF THE PREFERRED EMBODIMENT

Hardware Structure

Figure 1:
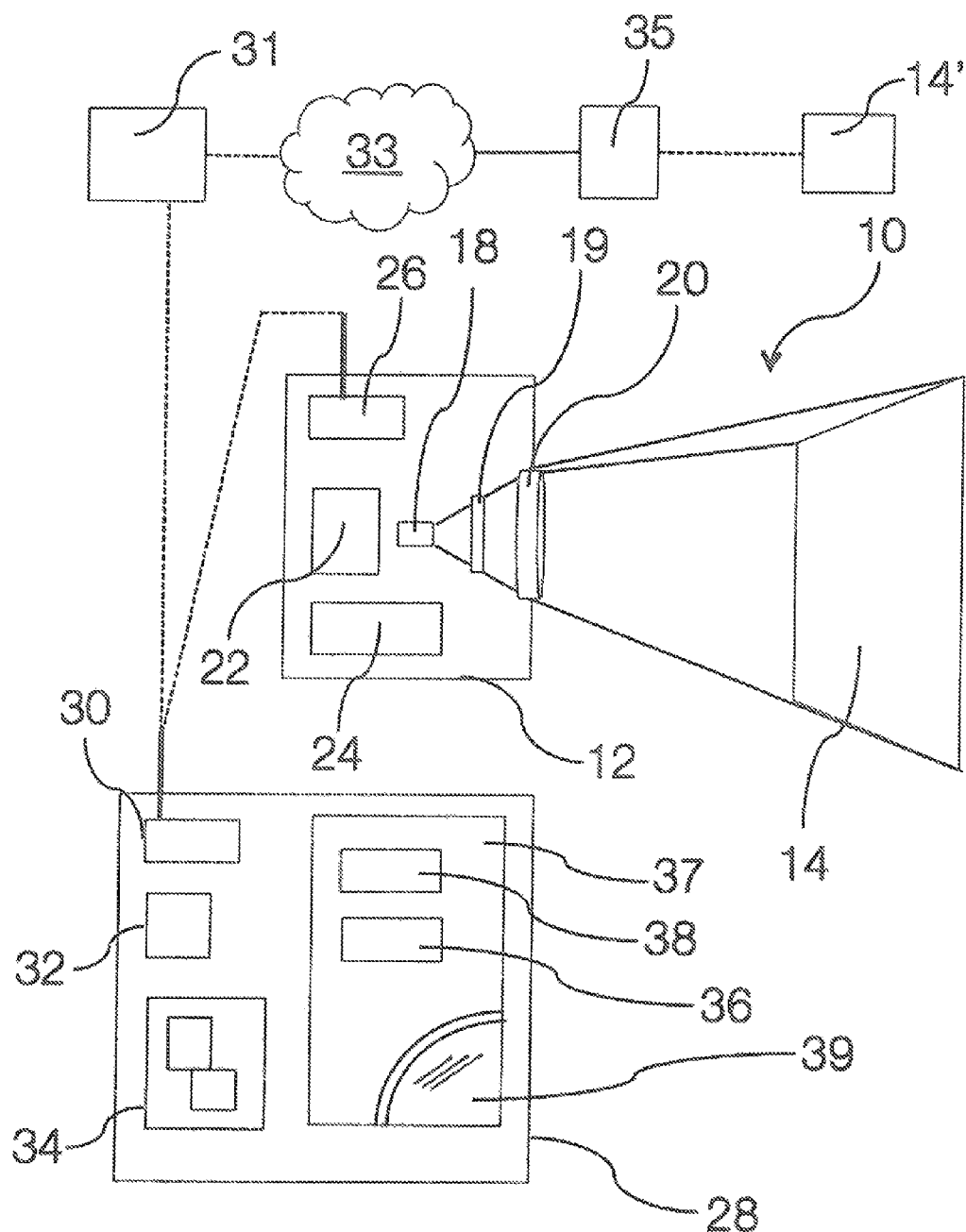
FIG. 1 is a block diagram of a presentation system suitable for use with the present invention including an audience display and a mobile wireless device for operation by a speaker.

Referring now to FIG. 1, a digital projection system 10 suitable for use with the present invention may provide for an audience display device 12, such as a digital projector, a large screen monitor or the like, providing a presentation image 14. Normally, the presentation image will have an area in excess of 10 square feet to be visible by a multiperson audience.

When the audience display device 12 is a digital projector, it may provide for a light source 18 passing light to a light modulator 19, for example, a liquid crystal array or digital light processor. The modulated light is then received by optical elements 20 to create the presentation image 14 on a reflective surface.

The light modulator 19 may be controlled by a processor 22 executing software or firmware stored in memory 24 which may act as a video buffer for a stored image data file controlling the light modulator 19. Image information for the stored image data file may be received from a wireless receiver 26, for example, implementing IEEE 802 11n protocol. Desirably the audience display device 12 provides a Wi-Fi display (WFD) under protocols implemented by the Wi-Fi Alliance. This protocol allows a device to send visual and audio content to the audience display device 12 in real time. Alternative protocols such as the WiDi protocol developed by Intel or Airplay protocol from Apple may also be used. Generally, such protocols provide for mirroring of the display information between devices.

The audience display device 12 may communicate with a mobile wireless device 28, for example, a smart phone or tablet such as one executing the Android operating system commercially available from Google or the iOS operating system available from Apple. The mobile wireless device 28 may be operated by a speaker (not shown) giving a presentation that makes use of presentation images 14. The mobile wireless device 28 may provide for a wireless transmitter 30 compatible with wireless receiver 26 for wirelessly transmitting image information that will be presented to the audience via the audience display device 12.

The wireless transmitter 30 may alternatively or in addition communicate with a local wireless router 31 communicating with the Internet 33, in turn communicating with presentation server 35 being a standard Web server as will be described below.

The wireless transmitter 30 may receive image data from a processor 32 of the mobile wireless device 28 executing a stored program held in computer memory 34 to control or manipulate images as will be described below. The processor 32 may also communicate with a presenter interface 36, for example, a presenter display 37, providing for a graphic display of a presenter image 38 to the speaker and a capacitive touch screen overlay 39, or the like, for receipt of data horn the speaker to control those presenter images 38 or any digital media through a touch sensitive surface as is generally understood in the art.

Figure 2:
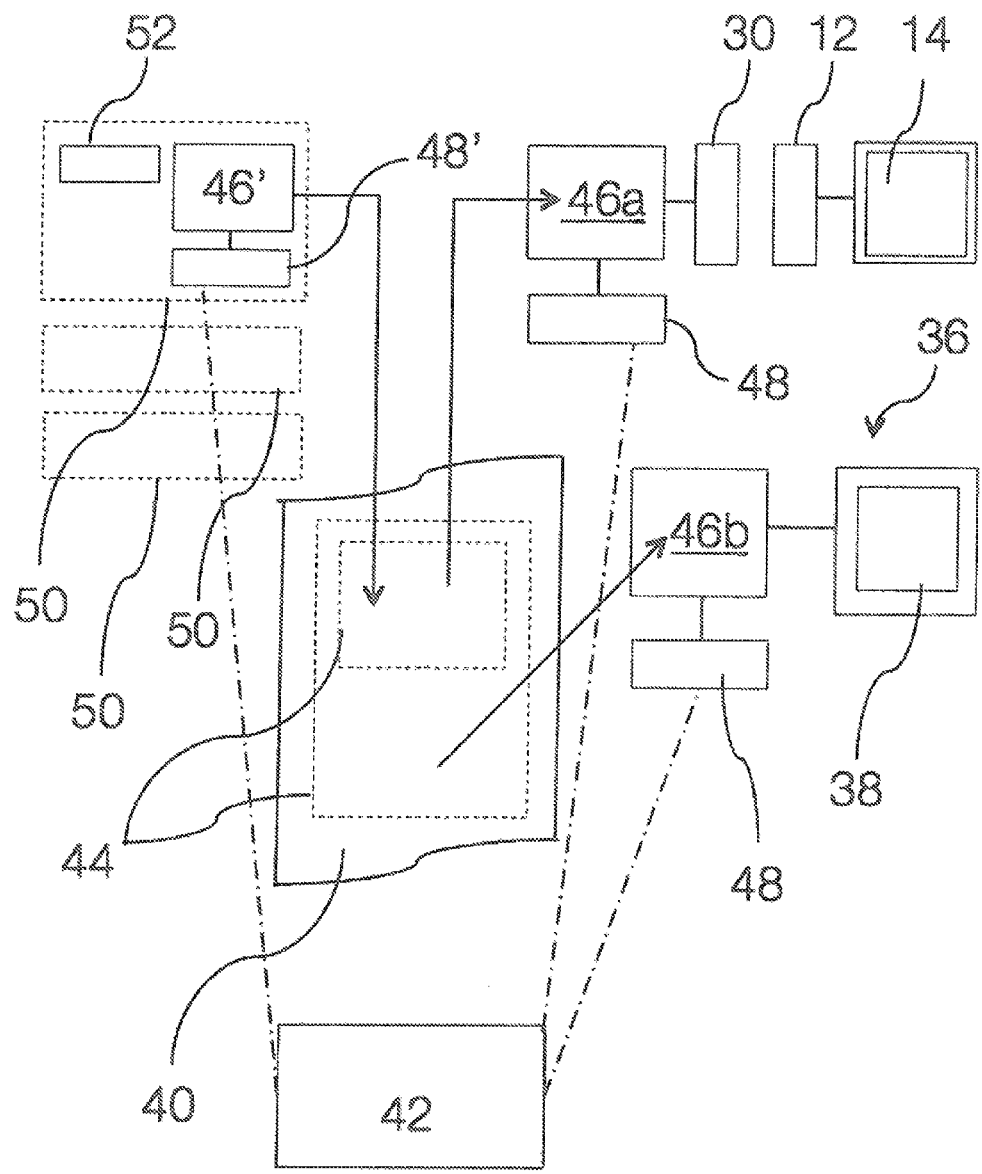
FIG. 2 is a software block diagram showing the programming elements of the mobile wireless device implementing the present invention.

Referring now to FIG. 2, memory 34 may provide for a screen buffer space 40 holding pixel data that may be used to generate presenter images 38 and/or presentation images 14. A presentation program 42 of the present invention control the allocation of buffer ranges 44 within the buffer space 40 to different ones of the presenter display 37 and audience display device 12 by means of memory mappers 46a and 46b, respectively. Each of the memory mappers 46a and 46b may be loaded with range values 48 set by the presentation program 42 to allow arbitrary allocation of the data of the screen buffer space 40 falling in the buffer ranges 44 to one or both of the audience display device 12 and presenter display 37. In many cases, the buffer ranges 44 will be disjoint but they may also overlap or one may be a subset of the other with, for example, the presentation image 14 being a subset of the presenter image 38 given to the speaker. The memory mappers 46a and 46b may be implemented in hardware, or combinations of hardware and firmware or software, as will be generally understood to those of ordinary skill in the art from this description.

The memory 34 may also hold one or more logical task programs 50 that include an application program 52 and associated data. A bidirectional memory mapper 46 and associated range values 48' may map the output of these logical task programs 50 and in particular application program 52 to predetermined huff em ranges 44 within buffer space 40 dictated by the range values 48k. Typically these mapped buffer ranges 44 are a portion of one or all of buffer ranges 44 used by memory mappers 46a and 46b. Range values 48 for each of the task programs 50 may be controlled by the presentation program 42 but also by the application program 52.

The bidirectional memory mapper 46' (unlike memory mappers 46a and 46b) generally maps not only output data from the application program 52 to a given buffer range 44 of the screen buffer space 40 but also maps input data to the application program 52 from, for example, a region of the touchscreen 39 corresponding to an area of an image developed by the given buffer range 44, back to the logical task program 50 associated with that given buffer range 44. For example, in the case of presenter image 38, the area of the presenter image 38 associated with the input will typically be the same area of the presenter image 38 associated with output from the application program 52.

Thus it will be understood that information from various application programs 52 may be flexibly written into the buffer space 40 and then independently allocated to the audience display device 12 and presenter display 37 at the discretion of the presenter as will be described below. In some cases each application program 52 writes into disjoint buffer ranges 44, but overlap is allowed in which case the data is composited with one set of data being "on top" of the other, for example, using z buffer convention.

Figure 3:
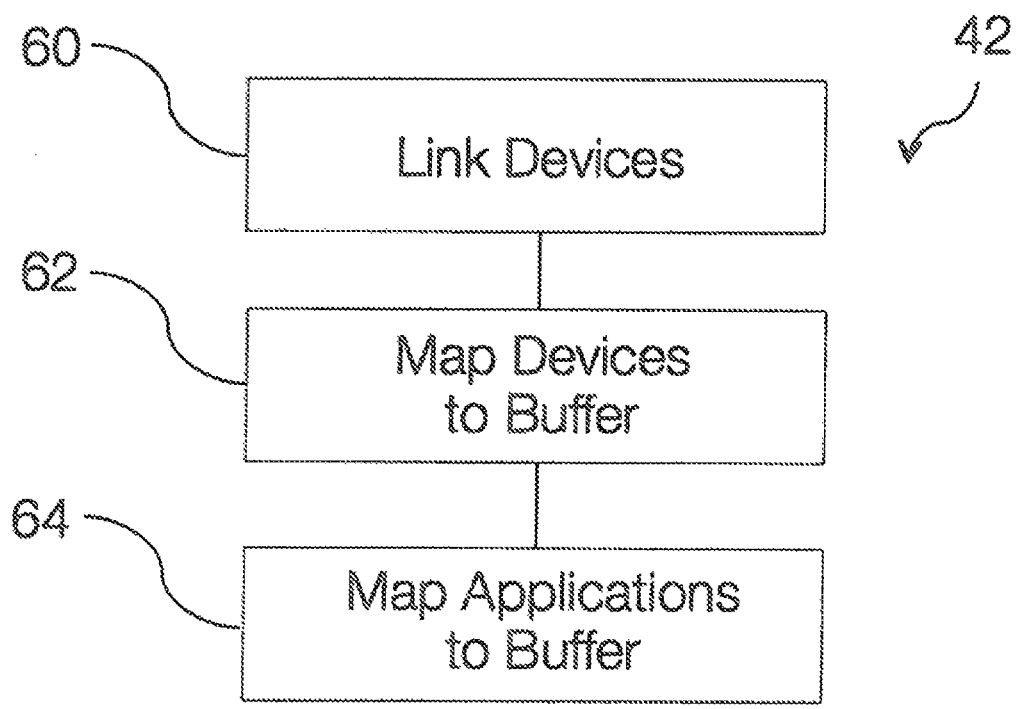
FIG. 3 is a simplified flowchart showing the principal steps of the operation of the mobile wireless device in the present invention.

Referring now to FIG. 3, the presentation program 42 will accomplish three principal tasks that will be described in more detail below. As indicated by process block 60, the presentation program 42 may link particular devices such as audience display device 12 to the mobile wireless device 28. This linking both establishes a connection under the protocols of the wireless transmitter 30, and wireless receiver 26 also determines the necessary amount of screen buffer space 40 required for the particular external device, creating an instance of or activating memory mapper 46 loading range values 48 as necessary.

At succeeding process block 62, a mapping screen buffer space 40, using memory mappers 46a and 48b to particular external display devices such as audience display device 12, may be controlled according to a variety of presenter commands and application programs 52 as will be described. Finally, at process block 64 a mapping of application programs 52 using memory mappers 46' to given buffer ranges 44 of the screen buffer space 40 is controlled also according to presenter commands and application programs 52.

Initial Operating Mode

Figure 4:
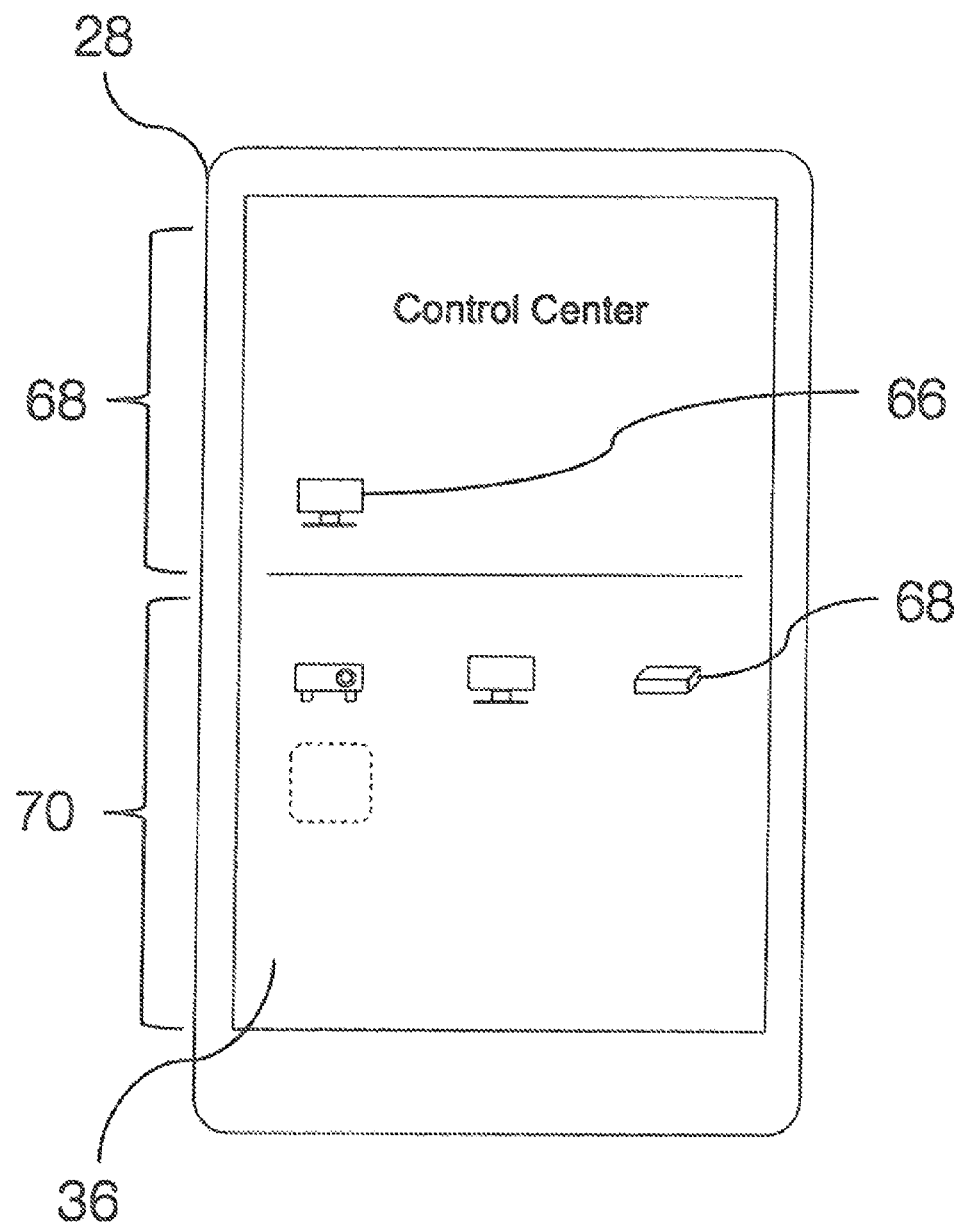
FIG. 4 is a screen display of an example mobile wireless device showing a step of linking the mobile wireless device to one or more audience displays.

Referring now also to FIG. 4, in one embodiment process block 60 displays to a presenter such as the speaker, on presenter display 37, a list of possible audience display devices 12 represented as display icons 66 to allowing the speaker to select one or more display devices to which the mobile wireless device 28 may be wirelessly connected. The audience display devices 12 of the display icons 66 may also include the server 35 which allows a given presentation to be served via the Internet 33 to remote users, for example, viewing on local computer systems or other display devices 14' through which the remote users may also transfer control of the presentation served or contribute content that is then shared with remote users and the original presenter in real or at the discretion of the user. The server 35 may also provide for recording of a presentation for later playback by remote users.

In one embodiment, the server 35 may provide for episodic transmissions to remote users, for example, "tweets" providing a static image "screenshot" of the current slide so that video capabilities need not be available to the remote users and extremely low bandwidth may be employed using applications commonly available in most smart phones, for example, and not necessarily specialized or proprietary to the presentation software. The occurrence of the tweet or similar episodic transmission, may be triggered by the a user command using a gesture input to the touch interface or an icon displayed on the mobile wireless device 28, or may occur automatically, for example when there is a change in slides. In this embodiment remote users would be able to contribute content to the original presenter and to other remote users in the form of tweets, comments or the like that could then be displayed through the presentation system to the audience display(s) in real time or at the discretion of the presenter or remote user currently in control of the content being displayed.

In one embodiment, the display icons 66 are held in storage region 70, and one or more audience display devices 12 may be connected to the mobile wireless device 28 by sliding the display icons 66 for that audience display device 12 from storage region 70 into a connection region 68 to designate a current connection. Underlying the display icons 66 may be a unique identifier, for example, a unique MAC address of the hardware of the audience display device 12. Multiple audience display devices 12 so connected to the mobile wireless device 28 each receive a mirroring of display information from the mobile wireless device 28 as will be described.

Alternatively, linking of the mobile wireless device 28 to a particular audience display device 12 may be done, for example, by entering a unique identification number for the audience display device 12, for example, by scanning a sticker holding a QRS code attached to or otherwise communicating with the audience display device 12, for example, by near field communication to obtain the number operating as a unique identifier. This number may provide or be linked to the necessary protocol for establishing a wireless connection.

Figure 5:
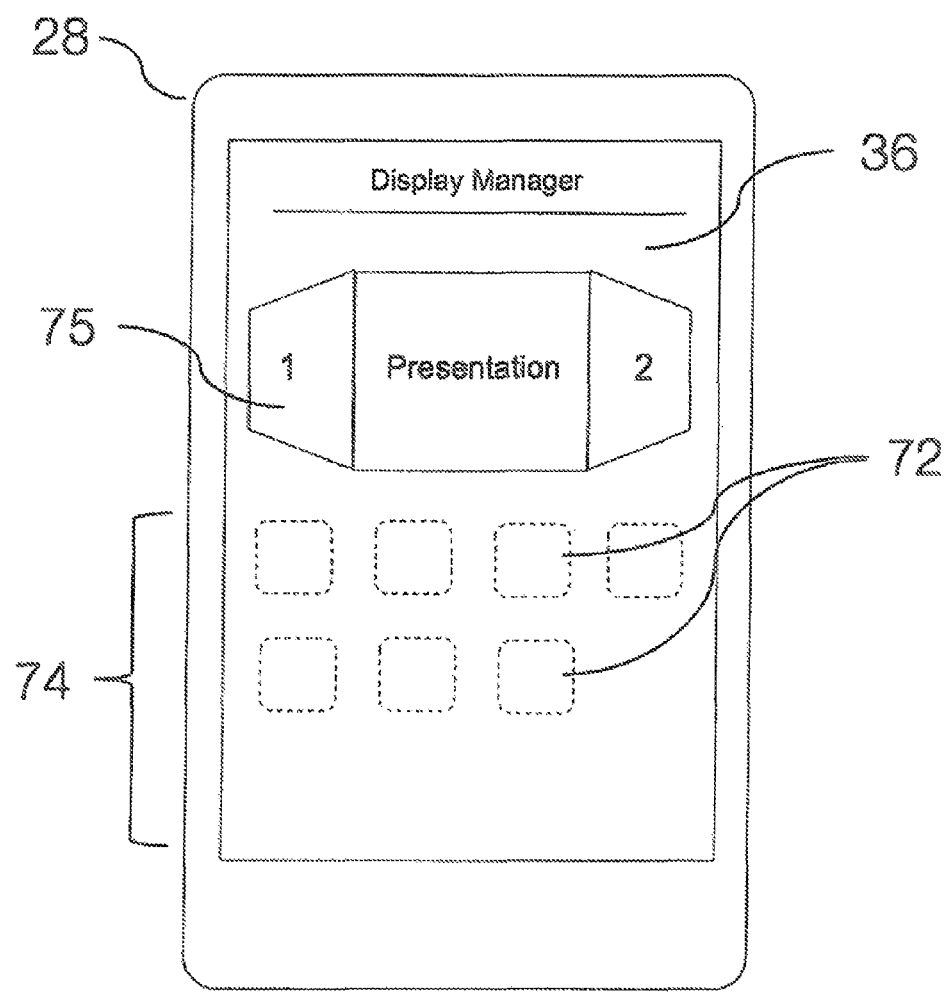
FIG. 5 is a screen display similar to FIG. 4 showing an assignment of application programs to display buffer regions.

Referring now to FIG. 5, in one embodiment, process blocks 62 and 64 may be implemented by displaying to the presenter, on presenter display 37, various application icons 72 representing different application programs 52 in a ready zone 74 on the presenter display 37 and allowing these application icons 72 to be dragged to one or more graphically represented predefined buffer ranges 44 represented by panels 75. In this embodiment, the panels 75 may be part of a "wheel display" that can be rotated left or right by "touch point dragging" to present different panels 75. A start or splash screen of each application program 52 dragged to a panel 75 may be shown for reference. Application icons 72 may represent any program executable on the mobile wireless device 28 or any media sources, for example, media player such as video players or the like.

In this case, the same buffer ranges 44 for the audience display device 12 will be a subset of the buffer range 44 for the presenter display 37 and each application program 52 will map to disjoint buffer ranges 44 that may be combined into the buffer range 44 for the presenter display 37 (for example, in the wheel display) and alternatively selected into the buffer range 44 for the audience display device 12 as will be discussed below. The buffer range 44 associated with each application program 52 will define the spatial extent of the input data received from the overlay 39 to the application program 52.

Figure 6:
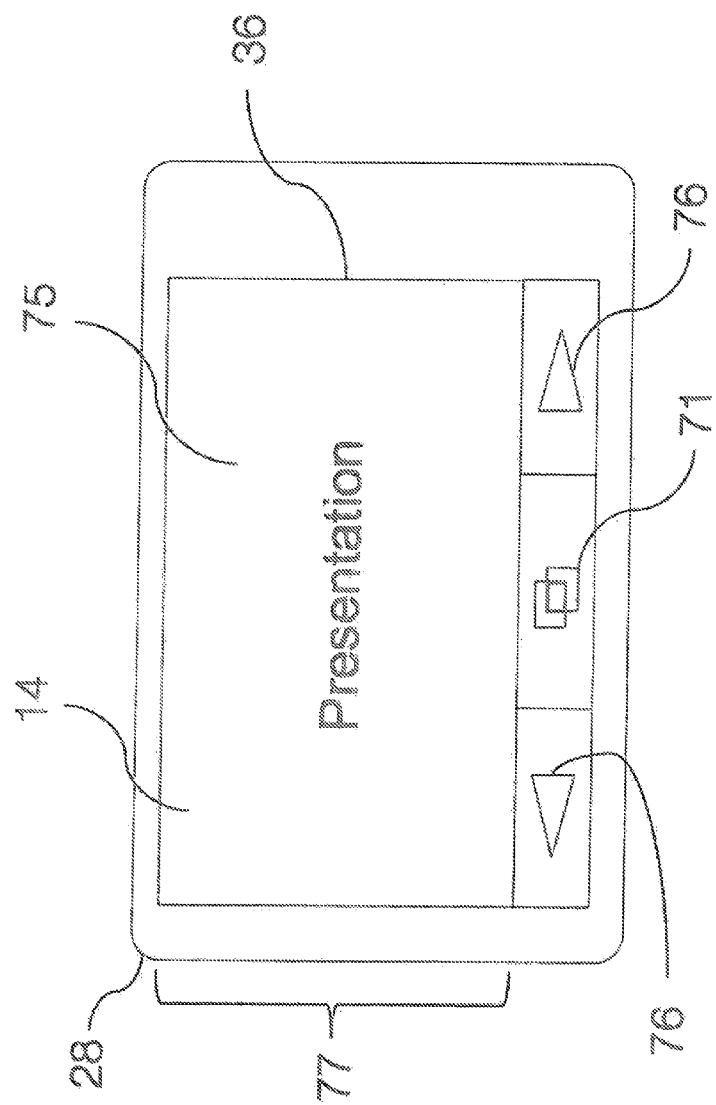
FIGS. 6 and 7 are a screen display showing a switching between screen buffer regions after assignment to application programs.
Figure 7:
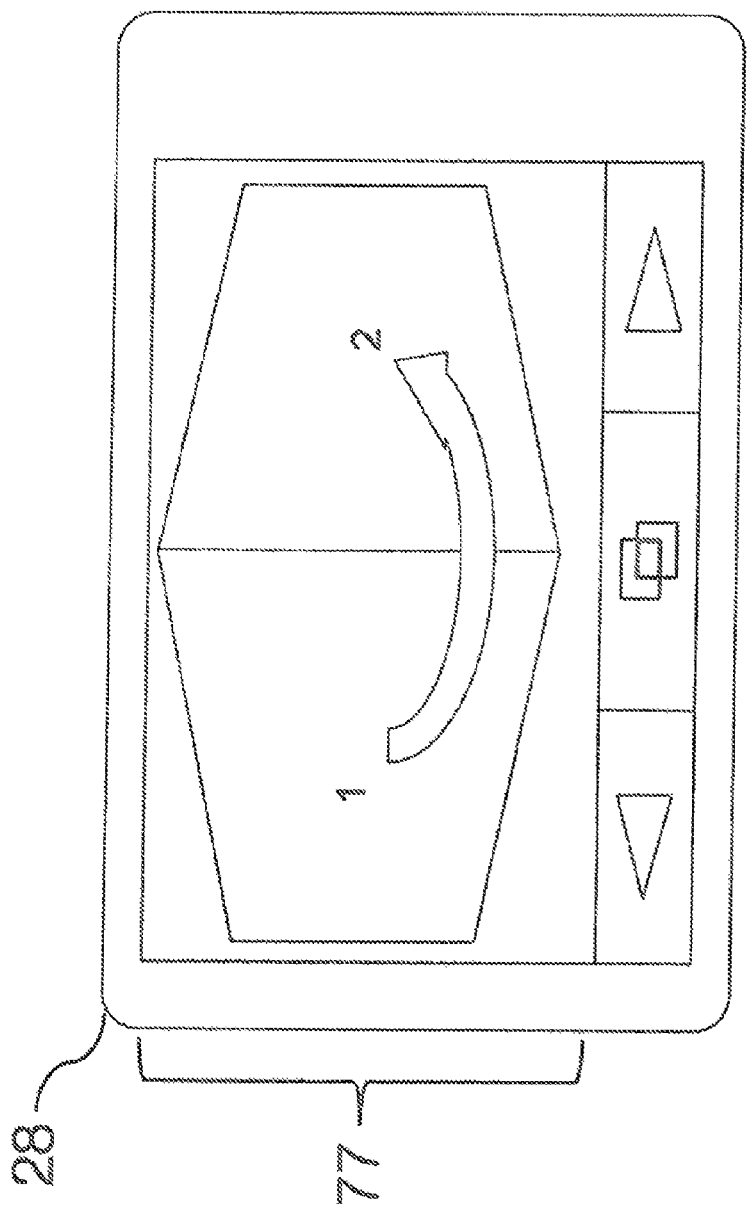

Referring to FIG. 6, a single panel 75 of the wheel display may be double tapped to move the data of the associated buffer range 44 to a single panel display in an upper portion 77 of the presenter display 37. This data provides a presentation image 14. The presentation program 42 allows the presenter to switch between applications programs 52, for example, by using the controls 76 (left and right arrows) to rotate through the panels 75 (present in the lower portion of the presenter display 37) as shown in FIG. 7. As each panel 75 is positioned after rotation, presentation image 14 of that panel 75 is mirrored to the audience display device 12 as the presentation image 14 with or without mirroring the controls 76 as determined by the presenter through gesture inputs to the touch interface or through button 84e. In this example, the given application program 52 maps its output data to the presentation image 14 and receives input data in the form of touches by the presenter only in the region of the presentation image 14 as displayed on the presenter display 37. Touch input by the presenter outside of the presentation image 14, for example, on the controls 76, is routed directly to the presentation program 42 so that the speaker may readily interact with and control the application program.

The above-described mapping process is very simple and provides for a basic level of control in which the speaker may move between screens that are being displayed and can in this way, create a very simple presentation. Nevertheless, the invention contemplates a more sophisticated presentation scheme shown in FIG. 8.

Figure 8:
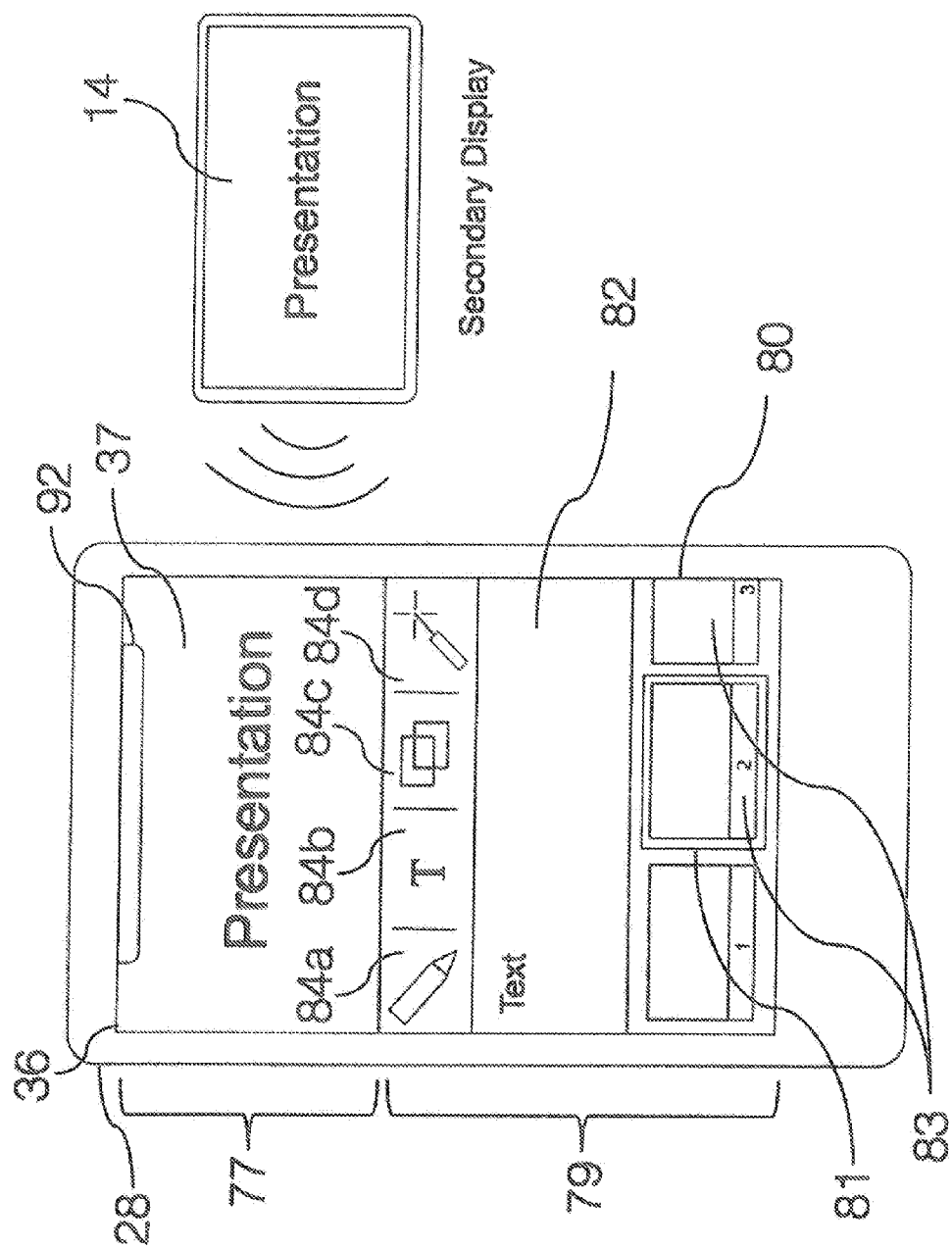
FIG. 8 is a screen display similar to those of the foregoing figures showing a specialized presentation task executing to mirror a portion of the display screen of the mobile wireless device to an audience display while preserving the remaining portion of the display screen of the mobile wireless device for a toolbar, and further showing presentation controls for slide notes and slide progression and showing the associated audience display.

Referring still to FIG. 6, when a presentation application program 52 is aligned in the panel 75, the presenter may press a center control 71 of the controls 76 that allows the presenter to enter a presentation mode shown in FIG. 8. In this presentation mode, an upper portion 77 of the presenter display 37 or other portions of the display as designated by the presenter is used to exclusively display the image data 78 on electronic slides in a buffer range 44 that is mirrored to audience display device 12, while lower portion 79 of the of the presenter display or any non-selected area is reserved for presenter accessible controls for controlling the presentation.

In this regard, the presentation application program 52 provides for two distinct sets of graphic outputs that may be mapped using two different buffer ranges 44, one allocated to the audience display device 12 (and the upper portion 77 of the presenter display 37) and the other allocated only to the lower portion 79 of the presenter display 37 and intended for viewing by the presenter only. However while this is the typical configuration for the mode previously described it does not limit the user by limiting their control of the mirrored area and graphic output 52 and corresponding buffer ranges 44. Users will be able to select and deselect portions of the screen to be mapped to the audience display device 12 using the functionality of the center control 71 or the multi-touch interface 102 in the combination with an interface such as the presentation application program 52. User inputs from the touch screen areas of the upper portion 77 and lower portion 79, however, are mapped back to the presentation application program 52 that allows the application program 52 to receive touch signals from upper portion 77 as will be discussed.

This image data may be manipulated within the upper portion 77, for example, to zoom in or out, by using pinch type gestures known in the art, or to pan left, right, up or down in the zoom mode by movement of the touch point within the upper portion 77 as is generally understood in the art. Uniquely, these gestures may only affect the image within upper portion 77 and not the other image displayed on the presenter display 37 at the discretion and control of the presenter. Similar gestures outside of the upper portion 77 may affect the entire image displayed on the presenter display 37.

The presenter controls of the lower portion 79 may include a timeline display 80 representing a series of electronic slides 81 of a presentation, like a PowerPoint presentation, that have been preprepared and are contained in a memory region associated with a slide presentation application program 52. The slide data may be PDF documents, images, or PowerPoint files. The slides 81 may be depicted by icons 83 in a single horizontal row, the latter of which may show thumbnails of the slides and may be scrolled left or right by the presenter's finger to provide an interactive timeline. The slight increase a size of the presented icon 83 toward the center shows the next displayed slide 81. Notably, data from the center most slide 81 is not displayed in the upper portion 77, rather the upper portion 77 shows a current slide mirrored to the audience display device 12. In this way the presenter may review and anticipate progression of the presentation for more seamless transitions.

Within the lower portion 79 but above the timeline display 80 may be a text box 82 holding and displaying text notes associated with a given slide 81 at the center most position of the timeline. In this way the speaker can read his or her notes as the slide 81 is being presented. These text notes are linked to the preprepared slides accessed by the slide presentation application program 52 and can be viewed solely on the device or shared to the audience display device in real time or at the users discretion by changing the mirrored area and graphic output 52 and corresponding buffer ranges 44 using gesture commands with the touch interface or functionality of the center control 71.

Above the notes section is a toolbar 84 providing for four tools 84a-84d. Tool 84a is a "pencil tool" which allows the presenter to draw on the image of slide 81 in upper portion 77 by moving his or her finger over the upper portion 77. The application program 52 then draws a line as if the presenter's finger were a pencil over the image of the upper portion 77 that is also mirrored to the audience display device 12. Generally the line is generated in a separate buffer range 44 that is composited to the buffer range 44 associated with the audience display device 12 so that it may be erased.

Figure 9:
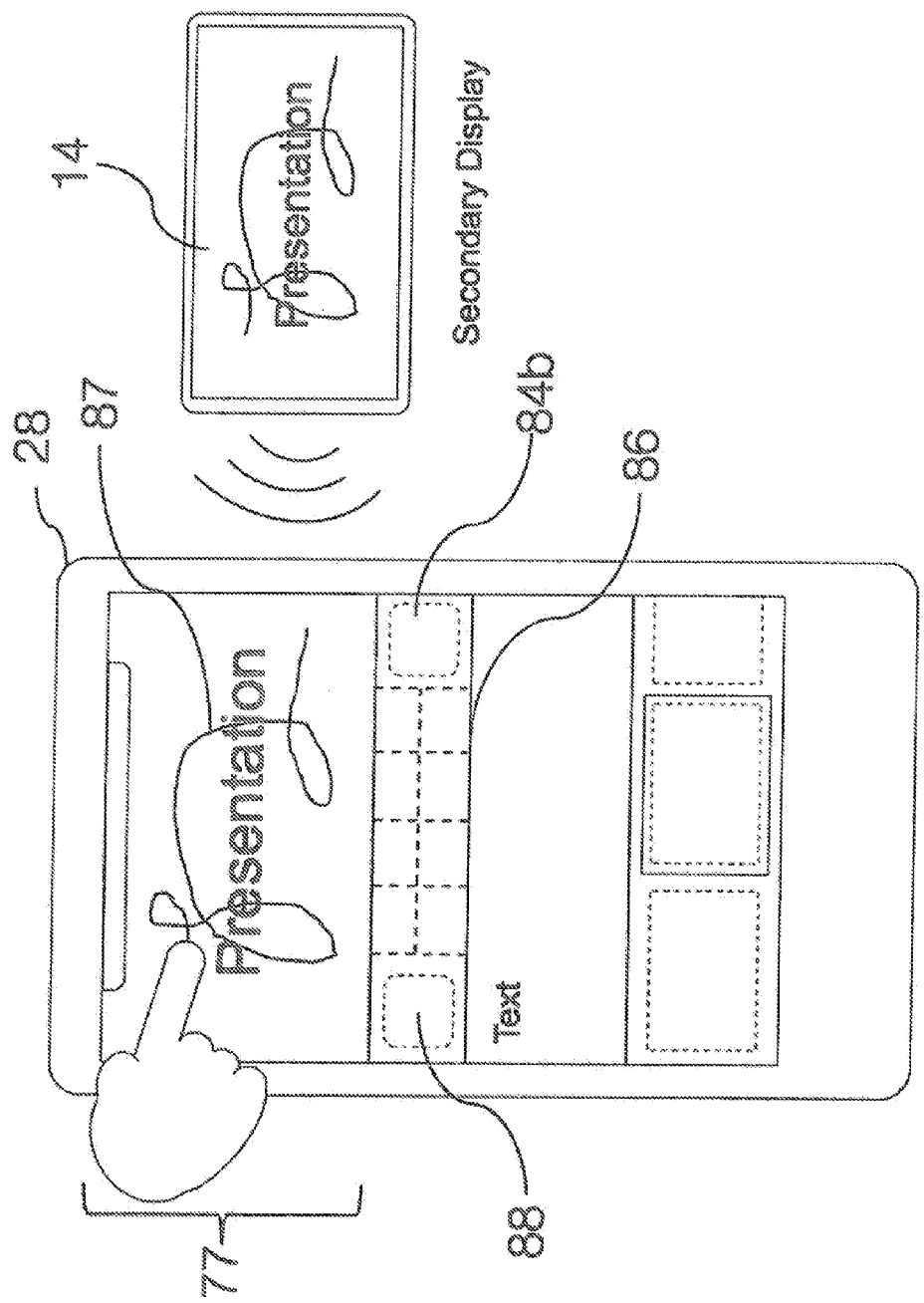
FIG. 9 is a screen display similar to that of FIG. 8 showing an expanded toolbar associated with a drawing tool.

Referring momentarily to FIG. 9, in one embodiment a tap gesture pressing the tool 84a may open a new expanded tool control 85 that provides a color palette 86 controlling the color of a line 87 that may be drawn over the image of upper portion 77, with the current color shown in a swatch display 88. This same color palette 86 may be applied to text as will be described below.

It will be appreciated that any modification of the presentation image 73 may be initially buffered in a buffer range 44 that is not mapped to the external audience display device 12 but only maps to the presenter display 37 where it is composited with the presentation image 73 for review by the speaker for correction, revision, etc. Invoking a special command in lower portion 79, for example, a flinging gesture may then be used to map this overlay image to the audience display device 12 in a compositing manner so that it is superimposed over that audience display device 12. In one application, for example, a professor may compose an answer to a problem displayed on a current slide without that answer being visible to students and then, may present the answer by flinging it to the display device 12.

Figure 10:
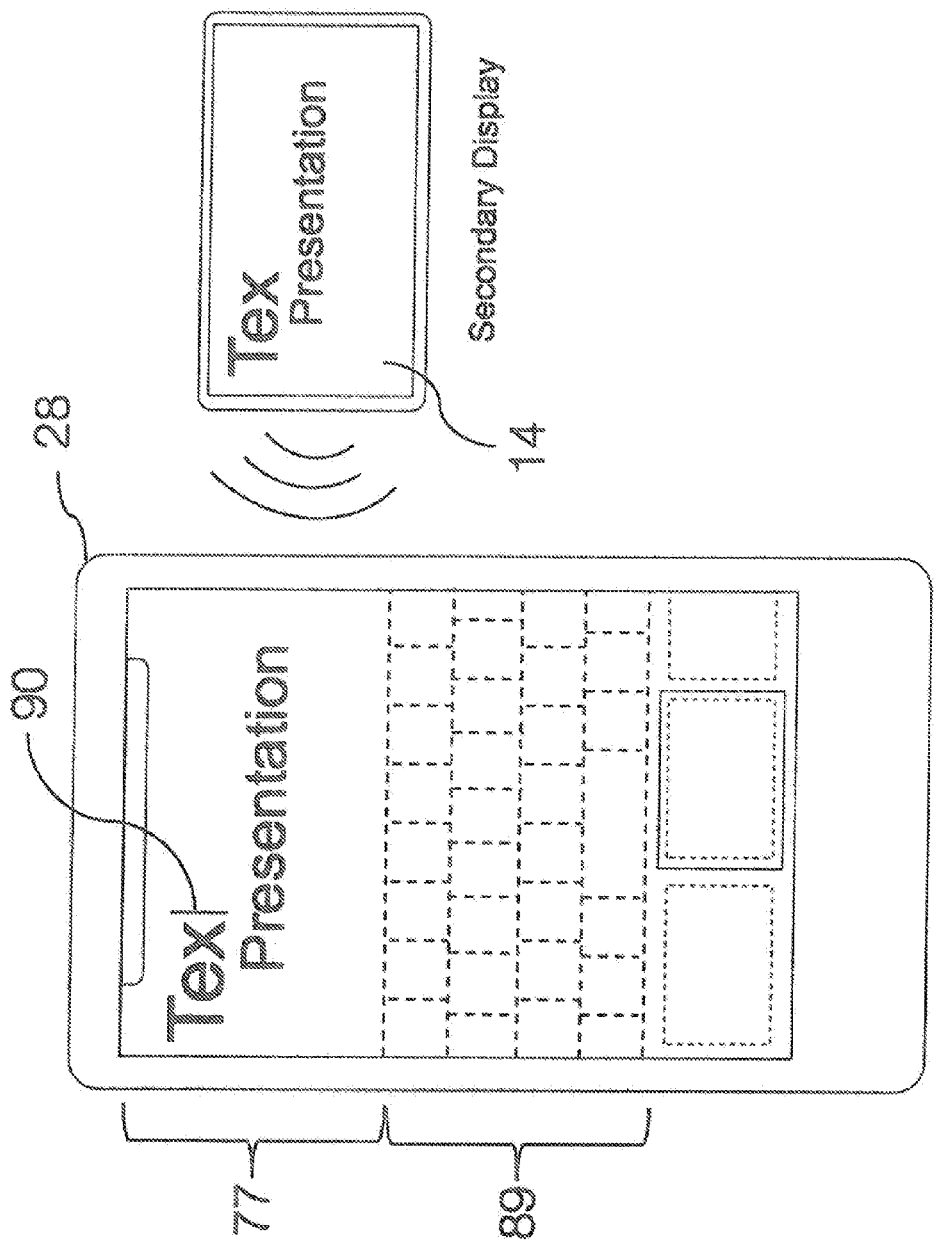
FIG. 10 is a screen display similar to that of FIG. 9 showing a virtual keyboard associated with a text tool.

Referring again to FIG. 8, a second tool 84b allows the entry of text as an overlay on the image of upper portion 77. Referring momentarily to FIG. 10, tapping this second tool 84b may invoke an expanded tool control 89 providing a touch screen keyboard of the type understood in the art allowing the text to be typed by the presenter. A cursor 90 may be located in the upper portion 77 by touching the upper portion 77 to allow control of the entry point of the text, and standard text editing, including backspacing, capitalization and the like, may be possible. Again pre-editing may be performed by the presenter and then the edited image "flung" to the audience display device 12.

Invoking tool 84d provides a virtual "laser pointer" that allows the presenter to touch the image of upper portion 77 and to move a simulated laser point about in the presentation image 14 as reflected onto the audience display device 12. The simulated laser point may be, for example, a small star or bright red dot. Unlike the pencil tool 84a, the trajectory of the dot is not made persistent although a short tail may be added to help improve its visibility. Additional capabilities of the "laser pointer" tool include the ability to create a solid line drawing on the upper portion 77 that is retained on the image and reflected to the audience display for the duration of continuous touch contact from the first contact that initiated the drawing.

Figure 11:
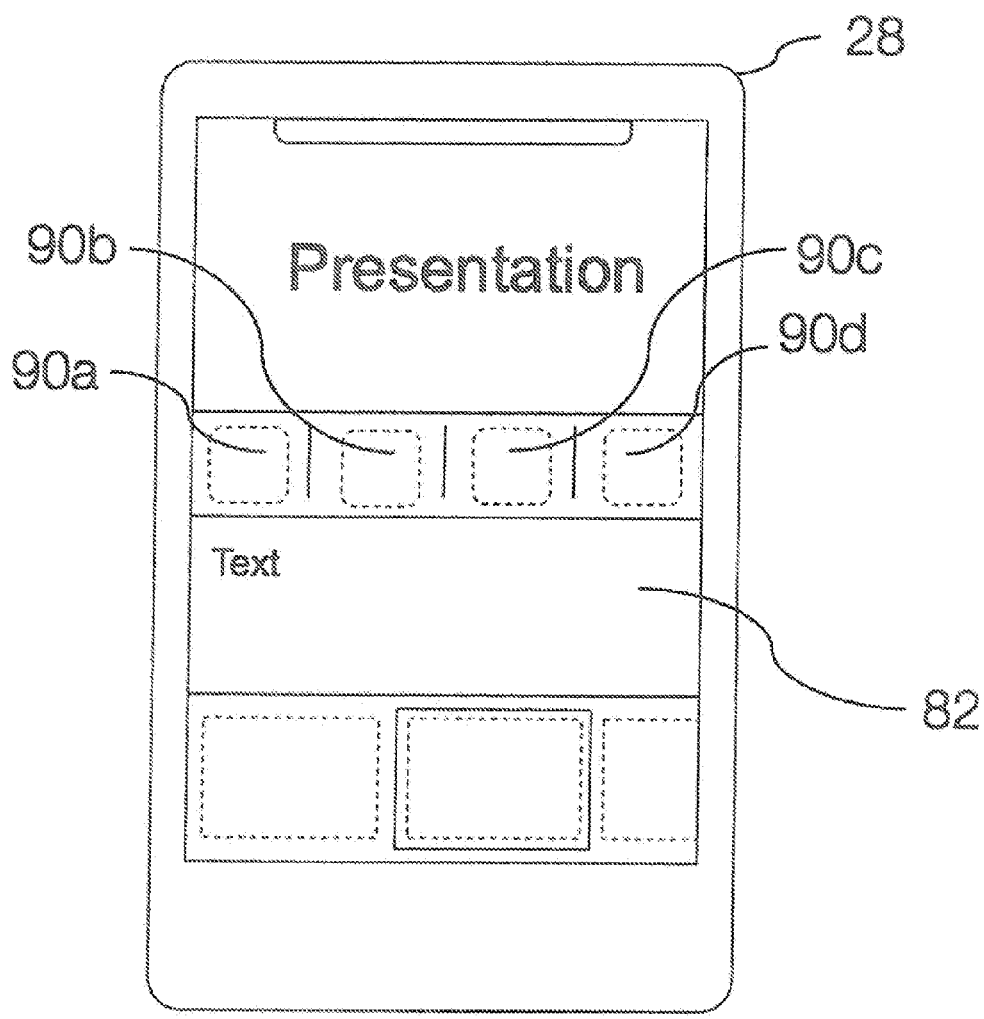
FIG. 11 is a screen display similar to that of FIG. 8 in which the remaining portion of the display screen provides for menu bar related to the presentation.
Figure 12C:
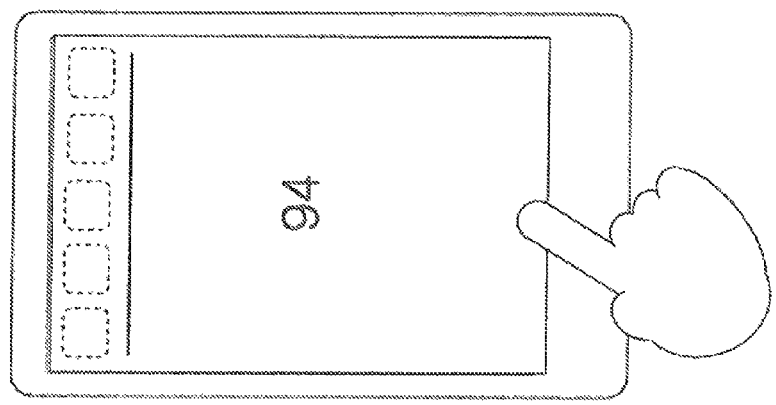
FIGS. 12a-12c are screen display showing the activation of a whiteboard whose output may be transmitted to the audience display shown in inset.
Figure 12B:
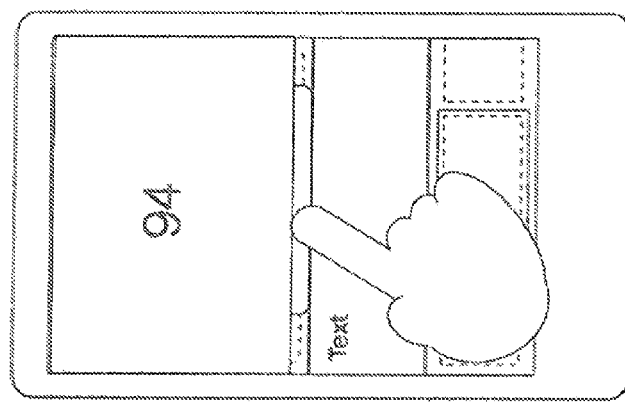
Figure 12A:
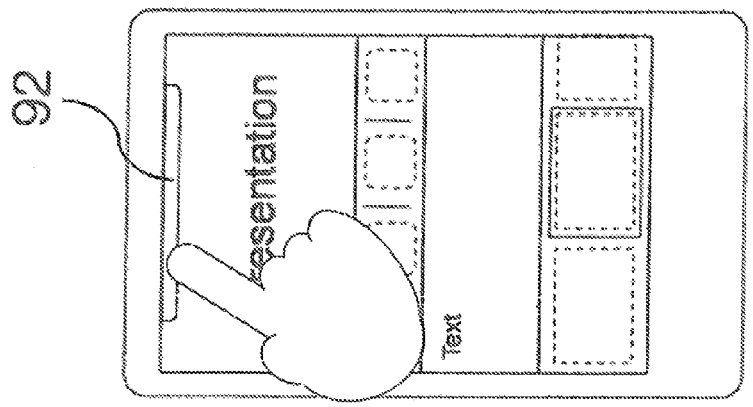

Referring still to FIG. 8, invoking tool 84c opens a menu bar shown in FIG. 11, providing for four new menu items 90a-90d. The first menu item 90a is designated "freeze" and invoking this menu item freezes the image being sent to the audience display device 12 to allow the presenter to switch tasks from the presentation program 42 to other tasks on the remote mobile wireless device 28 not necessarily related to the presentation. When the freeze menu item 90a is selected, the mobile wireless device 28 may return to its normal desktop mode.

Figure 14:
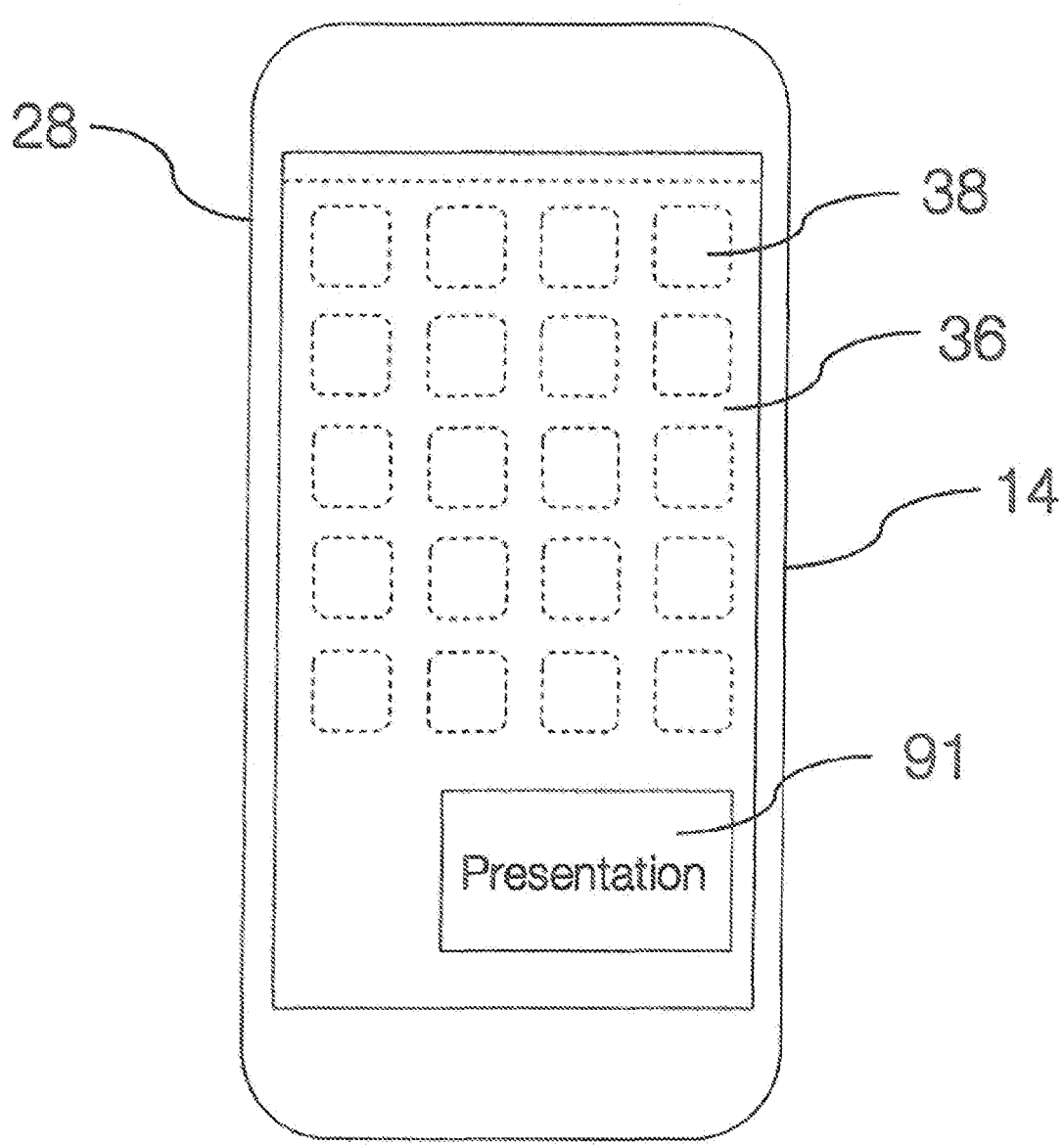
FIG. 14 is a screen display and an inset of the audience display showing a presentation window allowing access to other features of the mobile wireless device during a presentation.

As shown in FIG. 14, pressing the freeze menu item 90a may open a porthole 91 that holds the current display provided to the audience display device 12 so that may be monitored as other tasks are executed. When these additional tasks are completed, the presenter may return to the presentation program 42 by tapping porthole 91 to return to the display of FIG. 8.

Referring still to FIG. 8, a second menu item 90b designated "save" allows the presenter to save the current composited display of upper portion 77 (possibly including drawings, laser pointer or text) for future reference.

The third menu item 90c momentarily returns the presenter to the screen of FIG. 4 allowing different displays to be selected, added, or disconnected. Invoking the fourth menu item 90d allows the presenter to select alternative media sources to mirror to the audience display device 12 (for example, using the control of FIG. 5), for example, a media player for showing a video or the like.

Figure 13:
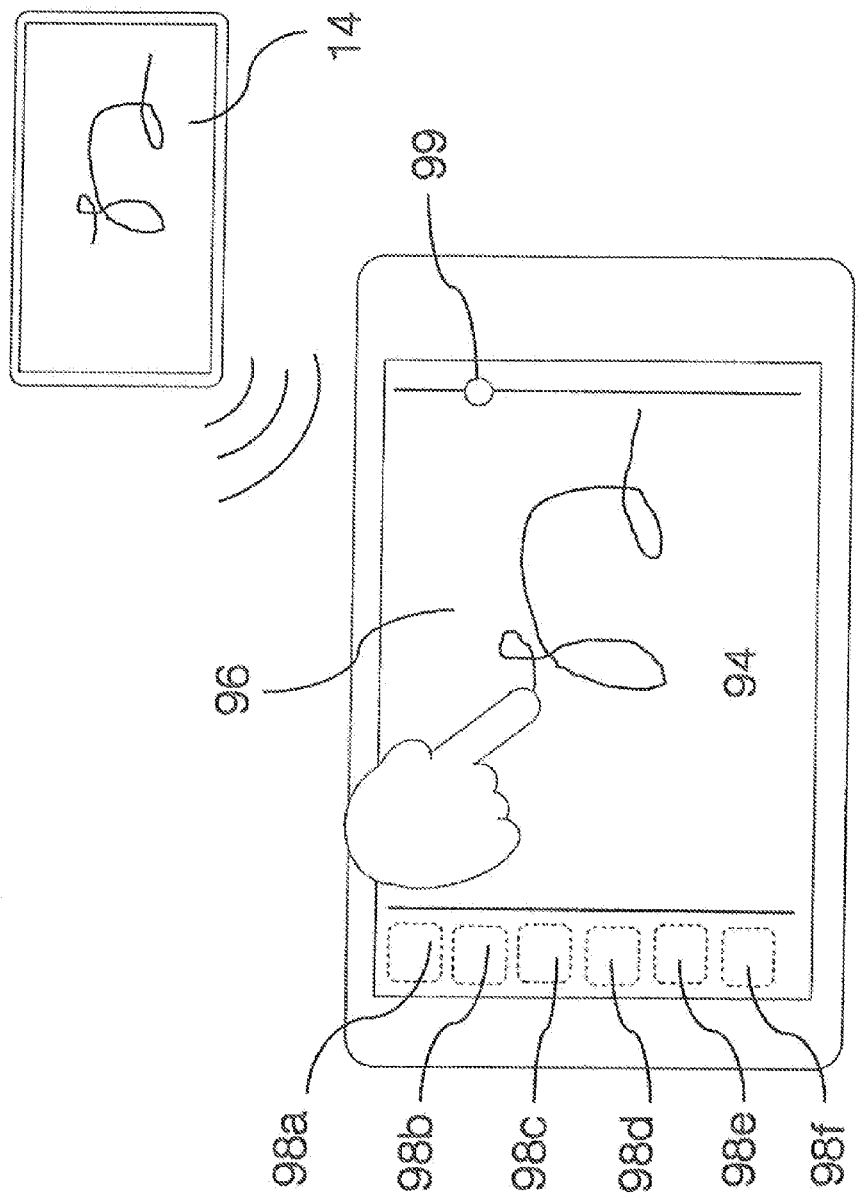
FIG. 13 is a figure showing use of the whiteboard and its result on the audience display as well as various whiteboard tools.

Referring again to FIG. 8, a whiteboard tab 92 may project slightly into the upper portion 77 to allow the presenter to "pull down" a whiteboard screen 94, for example, as shown in FIGS. 12a-12e by touching the whiteboard tab 92 and drawing it downward with a finger touch to pull the whiteboard screen 94 over the remainder of the display including the upper portion 77 and lower portion 79. As shown in FIG. 13, the whiteboard screen 94 may provide a drawing space 96 mimicking a conventional whiteboard that may be mirrored to the current audience display device 12 by switching the buffer range 44 to the buffer range 44 for the whiteboard screen 94. The whiteboard screen 94, as well as providing a drawing space 96, provides multiple tools including a drawing tool operating similarly to the pencil described above, an eraser tool 98b for erasing drawings on the whiteboard by erasing the corresponding data in individual buffer ranges 44 associated with the whiteboard, a color selection palette 98c changing the color of the line drawn by the other tools, a shape tool 98d allowing for the drawing of predetermined shapes such as polygons and circles, a text tool 98e operating similarly to the text tool described above and a menu navigation tool 98f allowing the presenter to move back to the screen of FIG. 5 without closing the whiteboard and then to be able to return to the whiteboard. A slider 99 control allows the image on the drawing space 96 to be scrolled up and down while the pinching gesture previously described and understood in the art allows the image to be zoomed in and out. When the whiteboard is fully open, the whiteboard tab 92 remains visible at the opposite side of the presenter display 37 and can be drawn in the opposite direction to close the whiteboard.

In one embodiment multiple users of presentation devices 28 may open the whiteboard application and may interact via the whiteboard so that input through any device appears composited on all users' whiteboards as well as a secondary audience display device 12.

Figures 15A, 15B:
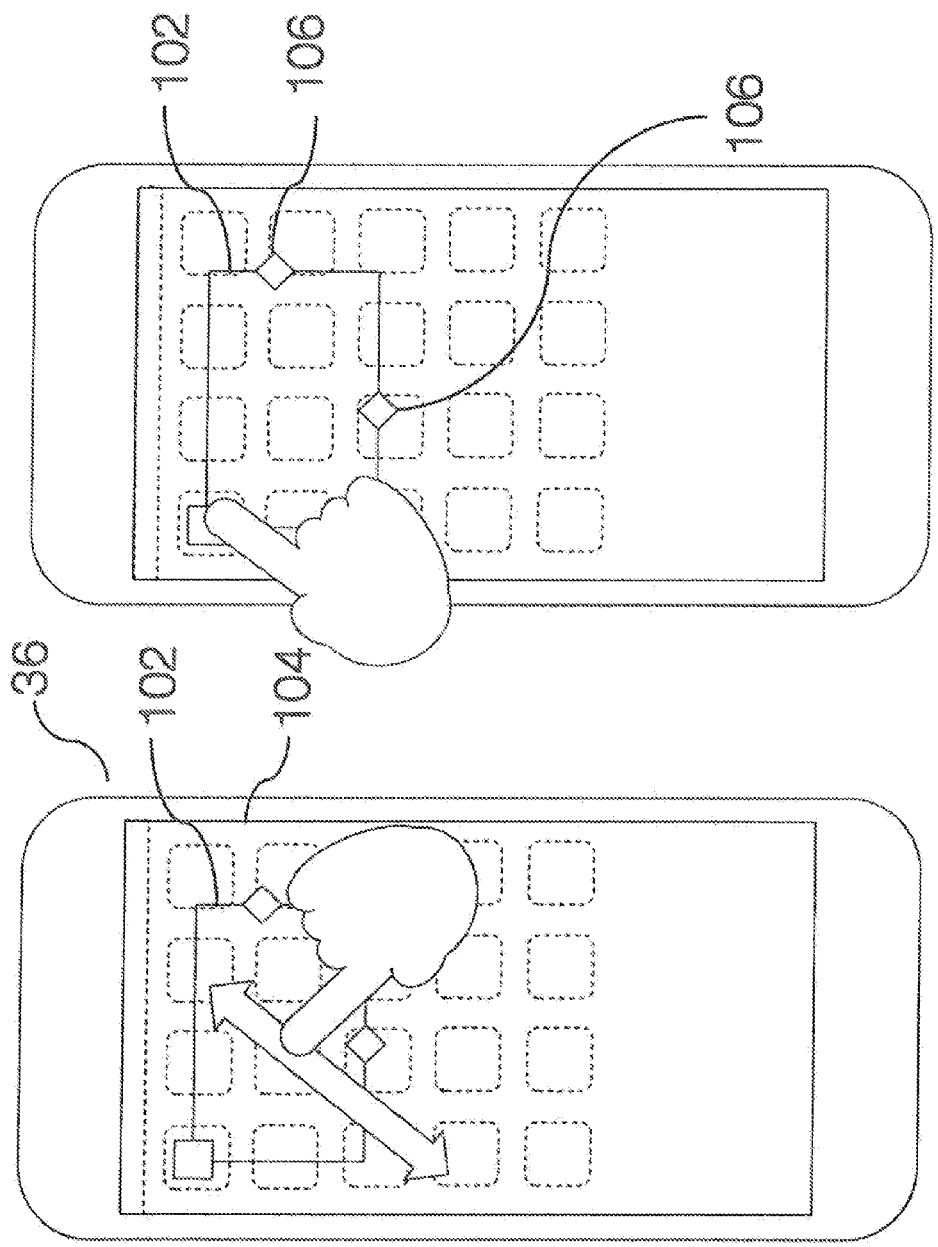
FIGS. 15a and 15b are screen displays showing the ability to define an arbitrary mirroring window to be sent to the audience display from the mobile wireless device.

Referring now to FIG. 15, in an alternative operating mode, the presenter may exert similar control over the mirroring of screen content to the audience display device by defining or manipulating a floating frame 102 that overlays the normal display of the mobile wireless device 28 to create a zone of mirroring to the audience display device 12 defined by the interior of the floating frame 102. In this way, conventional programs such as PowerPoint may be used in the selective mirroring of the present invention by placing the floating frame 102 over the slide intended to be shown while allowing the presenter controls that are off screen as far as the audience display device 12 and visible only on the mobile wireless device 28. The floating frame 102 may be moved by a swiping gesture shown in FIG. 1.5a and expanded or contracted by using a "pinching" two touch finger input multi-touch gesture or touching its corner points 104 (for simultaneous height and width adjustment) and side points 106 (for width or height adjustment only). In this case, the sizing and location of the floating frame 102 simply moves a buffer range 44 within the video buffer that is then locked to the audience display device 12. Turning the mirroring on and off or locking the location of the floating frame on the display may be done by double taps or the like within the mirror region.

Figure 16:
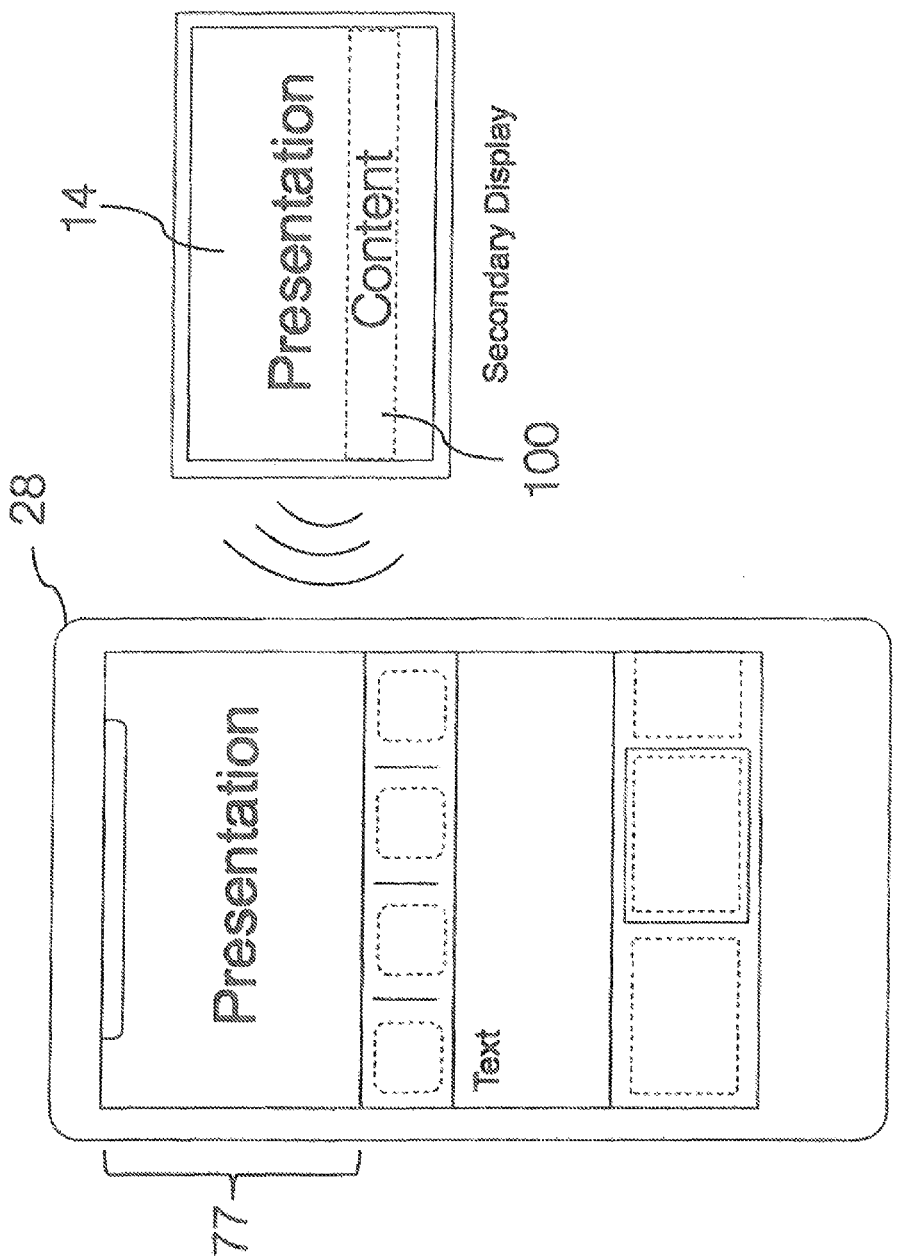
FIG. 16 is a screen display and inset of the audience display showing the ability to provide an image only on the audience display, for example, an advertising banner.

Referring now to FIG. 16, the presentation program 42 may develop a display only image 100 that may be controlled by the presenter and composited to the staged presentation image 73 as it is transmitted to the audience display device 12 with or without appearing in the upper portion 77. This display only image 100, for example, may be an advertisement banner that offsets the cost of the program in cases where the speaker wishes it to be free or may be a banner from a conference organizer or the like intended to be part of every presentation.

Figure 17:
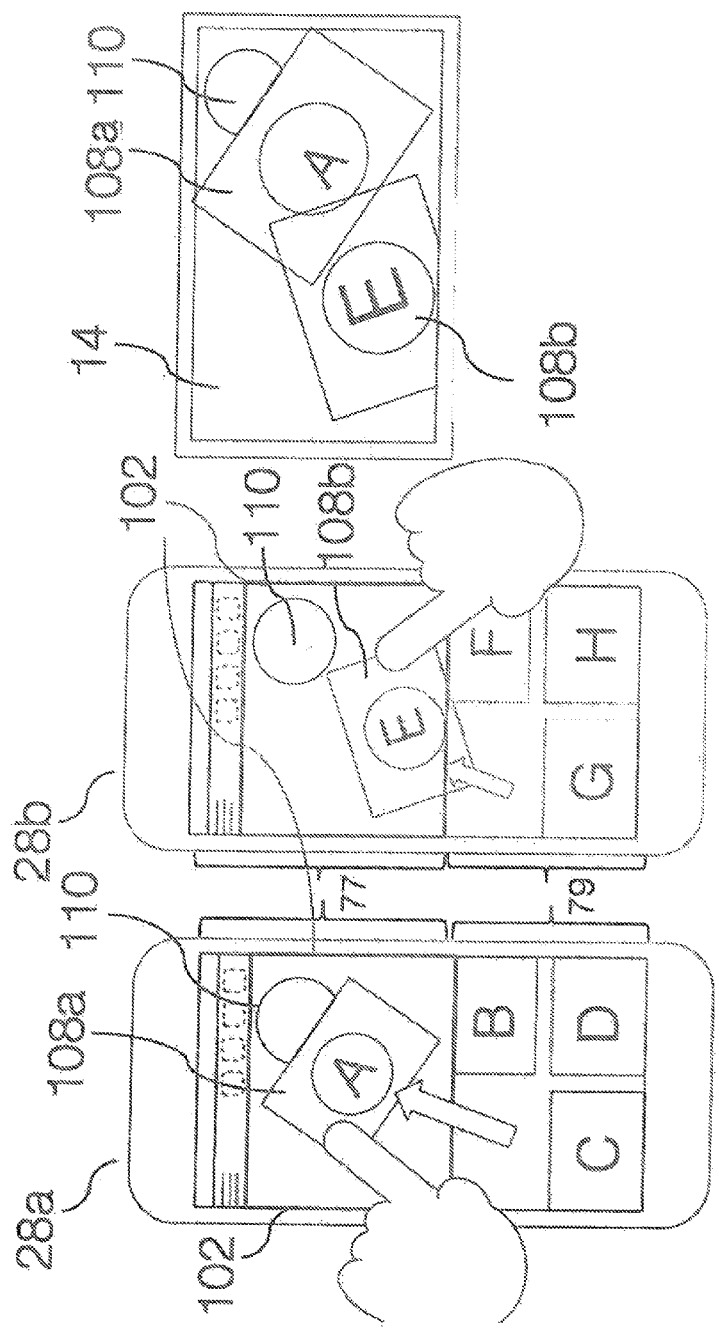
FIG. 17 is a figure similar to that of FIG. 8 showing a sliding of image output data from a task program from the screen display two different devices to the audience display.

Referring now to FIG. 17, the presenter having a first device 28a may define a floating frame 102 or a fixed frame providing the functionality of the upper portion 77 of the presenter display 37 as discussed above. Image output data frame 108a generated by different task programs may be dragged by user gesture from the lower portion 79 into the floating frame 102 to bring it onto the audience display device 12. The presentation image 14 may already have a presentation image 110 such as a slide 81 as described above. The output data frame 108a and the presentation image 110 will then be composited and sent to the audience display device 12. In one option, second presenter, using a second device 28h may likewise drag a second image output data frame 108b in their respective floating frame 102 on the second device 28b. This is output data frame 108b will then be composited with the output data frame 108a and presentation image 110 at the presentation image 14. An arbitrary z-axis value may be assigned to each of the devices 28a and 28h to allow for this compositing or one device may be given priority (for example a presenter) and other devices may be given lower priority allowing their images to be obscured (for example audience members). The output data frames 108 may be static images such as slides, or media players such as video players or the like producing a cine or moving or animated image or may be the visual output provided by programs like calculators, spreadsheets, drawing programs or the like each running a separate task programs. When using a program with drawing functions, the users can simultaneously exchange or create sketches, diagrams, written text, and circle or underline features of the displayed image.

While the present invention has been described primarily with respect to digital projectors projecting a light image onto a screen, it will be appreciated that the invention contemplates comparable digital image projection systems that employ, for example, extremely large size liquid crystal displays (LCDs), light emitting diode displays (LEDs), plasma displays and the like to the extent that they become suitable for presentations to an audience.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

All of the publications described herein including patents and non-patent publications are hereby incorporated herein by reference in their entireties.

We claim:

1. A presentation system comprising:
    an audience display including a wireless receiver adapted to receive an electronic image signal generating a presentation image from the electronic image signal for viewing by an audience;
    a mobile wireless device including;
        a device screen providing a device image;
        a presenter input for accepting input from a presenter;
        a wireless transmitter adapted to transmit the electronic image signal to the wireless receiver;
        an electronic memory holding a stored program; and
        an electronic processor communicating with the device screen, the presenter input, wireless transmitter, and electronic memory to execute the stored program to:
            (a) execute at least one task program to generate an electronic display image and an electronic non-display image;
            (b) display the electronic display image on a first portion of the device screen;
            (c) display the electronic non-display image on a second portion of the device screen different from the first portion;
            (d) accept input from the presenter to slide the electronic non display image from the second portion of the device screen to the first portion of the device screen to combine electronic display image and electronic non-display image and
            (e) transmit as an electronic image signal to the audience display system the electronic display image and the electronic non-display image limited to an area of the first portion of the device screen;
    wherein the electronic processor further executes a stored program to generate at least one display-only image to be composited with the electronic display image and transmitted as an electronic image signal to the audience display system and not displayed on the first portion of the device screen; and
    wherein the electronic processor further executes the stored program to generate in a first mode a presenter overlay image visually superimposed on the electronic display image on a first portion of the device screen and not transmitted as an electronic image signal to the audience display system and; in a second mode, to composite the presenter overlay image with the electronic display image as transmitted to the audience display system; and wherein the electronic processor switches between the first mode and the second mode according to input received through the presenter input.

2. The presentation system of claim 1 wherein the presenter input is a touch surface coextensive with the device screen and wherein the electronic processor further executes the stored program to receive input from the presenter via the presenter input over areas of the touch surface commensurate with the first and second portion of the device screen.

3. The presentation system of claim 2 wherein the electronic processor further receives presenter input to change an area of the first portion with respect to the second portion.

4. The presentation system of claim 2 wherein the electronic non-display image is a cine image.

5. The presentation system of claim 2 wherein the electronic display image is generated by a first task program running independently of a second task program generating the electronic non-display image.

6. The presentation system of claim 2 wherein the electronic processor accepts input from the presenter input over areas of the touch surface commensurate with the first portion of the device screen to display only a portion of the electronic display image on the first portion of the device screen to allow a zooming or panning of the electronic display signal.

7. The presentation system of claim 2 wherein the electronic non-display image provides textual notes associated with electronic display image signals currently displayed.

8. The presentation system of claim 2 wherein the electronic non-display image provide a reduced representation of flanking electronic display images in a sequence with the electronic display image and not currently transmitted as electronic image signals to the audience display system.

9. The presentation system of claim 2 wherein the electronic processor input from the presenter input over areas of the touch surface commensurate with the first portion of the display composite a pointer image in the electronic display image transmitted to the audience display system.

10. The presentation system of claim 9 wherein the electronic processor further generates a pointer trajectory image and composites the pointer trajectory image and the pointer image into the electronic display image transmitted to the audience display system.

11. The presentation system of claim 2 wherein the electronic processor accepts input from the presenter input over areas of the touch surface commensurate with the second portion of the display to provide for text entry and accepts input from the presenter input over areas of the touch surface commensurate with the first portion to identify a location of text images from the text entry and to composite the text images with the electronic display image transmitted to the audience display system.

12. The presentation system of claim 2 wherein the electronic processor executes a first task providing an image of the device screen and a second task selecting a portion of the image of the device screen as the electronic display image.

13. The presentation system of claim 1 wherein the electronic non-display image provides control symbols designating touch locations for the presenter to control a progression of multiple electronic display images to be displayed in the first portion of the device screen and transmitted to the audience display system.

14. The presentation system of claim 1 wherein the first and second portions of the device screen provide unbroken areas each comprising at least one-third of the screen.

15. The presentation system of claim 1 wherein the electronic processor further transmits as an electronic image signal to a remote server the electronic display image and the electronic non-display image limited to the area of the first portion of the device screen.

* * * * *